United States Patent [19]

Knopf

[11] 4,281,172

[45] Jul. 28, 1981

[54] ACRYLYL ESTERS OF POLYESTER-POLYETHER COPOLYMERS

[75] Inventor: Robert J. Knopf, Saint Albans, W. Va.

[73] Assignee: Union Carbide Corporation, New York, N.Y.

[21] Appl. No.: 132,652

[22] Filed: Mar. 21, 1980

[51] Int. Cl.³ ............................................. C07C 69/675
[52] U.S. Cl. .................................... 560/185; 528/354
[58] Field of Search .................. 560/185; 528/354; 525/415

[56] References Cited

U.S. PATENT DOCUMENTS

| | | | |
|---|---|---|---|
| 2,962,524 | 11/1960 | Hostettler et al. | 560/185 |
| 3,647,737 | 3/1972 | Dowbenko et al. | 560/224 |
| 3,689,531 | 9/1972 | Critchfield et al. | 560/185 |
| 3,700,643 | 10/1972 | Smith et al. | |
| 3,795,701 | 3/1974 | Jenkins et al. | 560/185 |
| 4,078,148 | 3/1978 | Vollkommer et al. | 560/185 |
| 4,183,113 | 7/1979 | Knopf et al. | 560/185 |

*Primary Examiner*—Natalie Trousof
*Assistant Examiner*—L. Hendriksen
*Attorney, Agent, or Firm*—Francis M. Fazio

[57] ABSTRACT

Acrylyl esters of polyester-polyether copolymers are produced by reacting a hydroxyl-terminated polylactone polyester with alkylene oxide and esterifying the resulting polyester-polyether copolymer with an unsaturated carboxylic acid such as acrylic acid or methacrylic acid. The resulting reactive esters are useful in ink, coating or adhesive formulations curable by thermal or radiation means.

21 Claims, No Drawings

ACRYLYL ESTERS OF POLYESTER-POLYETHER COPOLYMERS

BACKGROUND OF THE INVENTION

The hydroxyl-terminated polylactone polyesters are known materials that have found many useful applications in the ink and coating fields. However, in some instances they or their derivatives or formulations are not adequate for a particular use. This invention pertains to new polylactone polyesters derivatives produced by the reaction thereof with alkylene oxides as well as the acrylyl functional derivatives of the products from such reaction.

SUMMARY OF THE INVENTION

The novel compounds of this invention are the polyester-polyether copolymers defined by the formula:

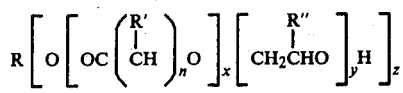     I and the acrylyl esters of such polyesters-polyether copolymers of the formula:

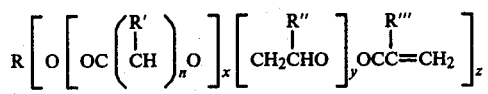     II wherein R is the organic residue of a mono, di, tri or tetrahydroxyl alcohol having from 1 to about 20 carbon atoms; R' is hydrogen or alkyl having from 1 to 6 carbon atoms with the proviso that at least $n+2$ R' groups in the $-OC(CR'H)_nO-$ moiety are hydrogen atoms; R'' is hydrogen, methyl or ethyl; R''' is hydrogen, methyl or cyano; n is an integer having a value of from 4 to 7, preferably from 5 to 6; x is an integer having an average value of from 2 to about 250, preferably from 2 to about 50, most preferably from 2 to 10; y is an integer having an average value of from 1 to about 100 or more, preferably from 2 to about 25, most preferably from 2 to 10; and z has a value equal to the valence of R and is from 1 to 4.

DESCRIPTION OF THE INVENTION

The novel polyester-polyether compounds of formula I are produced by the catalytic reaction of a polyactone polyester of the formula:

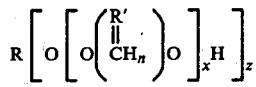     III with an alkylene oxide.

The polylactone polyesters are well known to those skilled in the art and many are commercially available. They are fully described, for instance, in U.S. Pat. No. 3,169,945, as is the process by which they are produced; the disclosures in said patent being expressly incorporated herein by reference. As described in this patent the polylactone polyesters are produced by the catalytic polymerization of a lactone and a functional initiator having at least one reactive hydrogen atom. The polylactone polyesters useful in this reaction have an average molecular weight of from about 225 to about 25,000, preferably from about 500 to 6,000, and most preferably from about 500 to 2,000; they can be single compounds or mixtures of compounds. Illustrative of lactones useful in producing the polyactone polyesters one can mention epsilon-caprolactone, zeta-enantholactone, eta-caprylolactone, as well as the mono-, di and tri-alkyl substituted derivatives thereof. Illustrative of functional initiators are the primary, secondary and tertiary alkanols such as methanol, ethanol, propanol, isopropanol, 1-butanol, 2-butanol, t-butanol, 1-pentanol, t-amyl alcohol, hexanol, 4-methyl-3-pentanol, 1-heptanol, 2-ethylhexanol, undecanol, diethylene glycol, triethylene glycol, 1,2-propylene glycol, dipropylene glycol, 1,3-propylene glycol, polyethylene glycol, polypropylene glycol, poly(oxyethylene-oxypropylene)-glycol, and similar polyoxyalkylene glycols, either blocked, capped or heteric, containing up to 40 or more oxyalkylene units in the molecule, 3-methyl-1,5-pentanediol, cyclohexanediol, 2-(4-hydroxymethylphenyl)ethanol, 1,4-butanediol, glycerol, trimethylolpropane, 1,2,6-hexanetriol, erythritol, pentaerythritol, and the like.

The alkylene oxides reacted with the polylactone polyesters are the oxirane compounds such as styrene oxide, ethylene oxide, 1,2-propylene oxide, 1,3-propylene oxide, 1,2-butylene oxide, 1,3-butylene oxide, 1,4-butylene oxide, as well as similar higher aliphatic monoepoxides, or mixtures thereof.

The reaction of the polylactone polyester with the alkylene oxide is carried out in the presence of a catalytic amount of a catalyst. This amount can be from 0.01 to 5 weight percent, preferably from 0.05 to 0.5 weight percent, of the combined weights of the reactants. The catalysts useful in this reaction are known to those skilled in the art of alkylene oxide addition chemistry and require little further discussion here. Illustrative thereof one can mention boron trifluoride etherate, potassium, potassium hydroxide, sodium, sodium hydroxide, sodium ethoxide, the mineral acids, stannic chloride, zinc chloride, antimony trifluoride, phosphorus pentafluoride, boron trifluoride and other Lewis acids. During the reaction one can have present a conventional inhibitor in the known concentration.

During the production of the compounds of formula I the temperature is from about 20° C. to about 100° C., preferably from about 35° C. to about 60° C. The specific temperature employed will often depend upon the particular reactants and catalyst selected. The reaction time will vary with the batch size as well as with the reactants and reaction conditions employed. The reaction can be carried out at subatmospheric, atmospheric or superatmospheric pressure. Pressure is not critical and sufficient pressure is used to retain the reactants in the reactor. One can also, if desired, carry out the reaction in an inert gas atmosphere.

The amount of alkylene oxide charged to the reaction is from 1 to about 400 moles, preferably from 2 to 100 moles and most preferably from 2 to 40 moles, per mole of polyactone polyester of formula III charged. However, in most instances one will use from 5 to 10 moles of alkylene oxide when z has a value of 1 or 2.

If desired, an inert solvent such as toluene, benzene or 1,1,1-trichloroethane can be present; however, in most instances it is not required.

The polyester-polyether of formula I produced by the reaction of the polylactone polyester and the alkylene oxide is recovered by neutralizing the reaction mixture, filtering to remove solid-impurities and stripping to remove solvent or volatile impurities. The residual product, comprises a mixture of individual compounds corresponding to formula I.

The polyester-polyether so produced is reacted with an unsaturated acrylyl acid of the formula:

$$CH_2=\overset{R'''}{\underset{|}{C}}COOH \qquad IV$$

to produce the acrylyl esters of formula II. The suitable acids are acrylic acid, methacrylic acid and cyanoacrylic acid.

This esterification reaction is carried out by procedures known to those skilled in the art at temperatures of from about 40° C. to 100° C., preferably from 60°C. to 80° C., generally in contact with an esterification catalyst such as toluene sulfonic acid, methane sulfonic acid, sulfuric acid, phosphoric acid, or similar catalyst.

During the esterification an inert solvent is generally present, which also serves as an azeotroping agent to remove water formed. Illustrative of suitable solvents are benzene, toluene and similar inert solvents. The solvent selected is preferably one which boils at the temperature, whether atmospheric or subatmospheric, at which one desires to conduct the esterification. In this manner temperature control is readily achieved.

The amount of acrylyl acid used is an amount sufficient to react with the free hydroxyl groups of the polyester-polyether of formula I. It is known, however, that an excess is charged to ensure complete esterification.

During the esterification an inhibitor is used to minimize polymerization. It is present at a concentration of from about 0.001 to 1 weight percent of the charge. The inhibitors, as well as the manner in which they are used are well known to those skilled in the art and illustrative thereof are the monomethyl ether of hydroquinone and alloocimine.

The time required for the esterification reaction will vary depending upon the size of the batch and the particular reactants and catalysts employed as is known to those skilled in the art. At the conclusion of the esterification reaction, the mixture is cooled, neutralized, filtered and the desired formula II ester is recovered by conventional recovery proceedings. These generally involve separation of the water and organic layers, washing the organic layer to remove water-soluble impurities, distillation to remove solvents and other volatile compound, followed by a final filtration to remove any solid matter that may have precipitated during this recovery procedure.

The acryl esters of formula II can be used per se or in formulated compositions useful as inks, coatings, overprint varnishes or adhesives that can be cured by thermal or radiation means. In producing formulated compositions the novel compounds of this invention are compounded with known activators or catalysts, photoinitiators or photosensitizers, pigments or colorants, solvents, wetting agents, flow control agents, stabilizers, flatting agents, other reactive components, or other compounds normally used in the art and in the concentrations known to be useful. The formulators are fully familiar with these components and with the requirements in the particular area of technology involved to obtain the optimum properties in the ink, coating or adhesive.

It is known that when cure is to be accomplished by thermal means a conventional free radical catalyst or activator is generally added to expedite the cure; when cure is to be achieved by particulate radiation, such as high energy election beam radiation, an activator is usually not required; when cure is to be effected by light radiation, such as ultraviolet light, a photosensitizer of photoinitiator, with optionally an activator therefor, is used to render the process commercially and economically acceptable. The formulated compositions can contain up to 100 weight percent, preferable from 25 to 95 weight percent, of the novel acrylyl esters of this invention as the reactive component with the other components, which are well known to those skilled in the art and which need no further elaboration herein to enable such person to produce the formulations, making up the balance of the compositions.

In a typical embodiment a polyactone polyester having from 1 to 4 reactive hydroxyl groups and an appropriate catalyst are charged to a reactor and heated to the desired temperature. Then the alkylene oxide, or a mixture of alkylene oxides, is added to the reactor at a rate to maintain the desired temperature. When the addition has been completed, the contents of the reactor are stirred and heated for an additional period to ensure completion of the reaction, neutralized, vacuum distilled to remove volatiles and filtered to remove solids. The polyester-polyether copolymer of formula I so produced is then esterified with a functional acrylyl acid at a slightly elevated temperature using an inert solvent as the azeotroping agent to remove water of reaction and an esterification catalyst. At the completion of the esterification reaction, the acrylyl ester product of formula II ie recovered.

The following examples serve to further define this invention.

EXAMPLE 1

To a reactor equipped with a stirrer, thermometer and feed funnel there was charged a mixture of 1,060 g of a polycaprolactone diol having an average molecular weight of about 530 and 10.6 g of boron trifluoride etherate. The diol was the reaction product of ethylene glycol with four moles of epsiloncaprolactone. The temperature was raised to 50° C. and 464.6 g of propylene oxide was added over a one hour period while maintaining the temperature at from 48° C. to 50° C. The mixture was stirred an additional two hours at 50° C., 30 grams of magnesium silicate was added and the mixture was stirred at 90° C. for another two hours after which vacuum was applied to remove volatiles. The vacuum was maintained at 5 to 10 mm Hg until all volatiles were removed and the mixture was then filtered hot under vacuum to yield 1,405 g of clear, viscous, amber liquid polycaprolactone-polyoxypropylene adduct having a hydroxyl number of 148.8 and an average molecular weight of 754. Upon cooling to room temperature the adduct solidified. (Adduct A).

To a reactor equipped with a stirrer, gas inlet tube and condenser there was charged 753.7 g of Adduct A and 5.65 g of triphenyl phosphite. The reactor was purged with nitrogen and the mixture was stirred at 130° C. to 135° C. for one hour. After cooling to 60° C., 407 g of toluene, 189 g of acrylic acid, 20.9 g of p-toluene sulfonic acid, 0.95 g of 2,4-dimethyl-2, 4,6-octatriene, 0.095 g of the monomethyl ether of hydroquinone inhibitor and 0.86 g of activated carbon were added and the reactor was purged with nitrogen. The mixture was heated at reflux of 71° C. to 75° C., under nitrogen atmosphere, for 19.5 hours while a total of 33.2 g of water was azeotropically removed. It was then cooled to room temperature and neutralized to a pH of 8 with 454.2 g of a 7.5 weight percent aqueous sodium hydroxide solution. The system was then allowed to settle and the bottom aqueous phase was removed and discarded. The top organic layer was filtered and vacuum distilled at a temperature up to 50° C. and a final pressure of 2 mm Hg to remove solvent and volatiles. The stripped residue was filtered again to yield 362.3 g of the clear, liquid acrylate ester of the polycaprolactone-polyoxypropylene adduct. It had a specific gravity of 1.083 g/cc at 25° C., a Brookfield viscosity of 525 cks at 38° C. and a Gardner color of 4. Further analysis established an ester functionality of 5.98, an acrylate functionality of 1.94, an inhibitor content of 485 ppm, and a residual acidity of 9.28% calculated as acrylic acid (Ester A).

In a similar manner a trifunctional acrylate ester is produced using a trifunctional polycaprolactone triol having an average molecular weight of 300, obtained by the reaction of glycerol with epsilon-caprolactone, by initially reacting the triol with about 12 moles of ethylene oxide followed by esterification with acrylic acid.

A series of formulations was produced and evaluated as overprint varnishes for wet inks in printing operations. The formulations were applied over a wet print and cured by exposure to ultraviolet light radiation, under a nitrogen atmosphere; cure was achieved in a matter of seconds to yield a durable, dry film. The compositions and results are tabulated below with concentrations indicated in parts by weight. Each composition additionally contained 2 parts of di-sec-butoxyacetophenone as photoinitiator and 1 part of dimethylsiloxane-poly(oxyethylene-oxypropylene)copolymer wetting agent.

TABLE I

| Run | 1 | 2 | 3 | 4 | 5 |
|---|---|---|---|---|---|
| Ester A | 97 | 72 | 72 | 72 | 72 |
| TMPTA | — | 25 | — | 25 | — |
| PETA | — | — | 25 | — | 25 |
| Viscosity, cps. 25° C. | 500 | 470 | 750 | 470 | 750 |
| Gloss, 60° | 43 | 65 | 61 | 58 | 57 |

TMPTA - trimethylol propane triacrylate
PETA - pentaerythritol triacrylate

Pigmented compositions are produced by the addition of titanium dioxide or other colorant to the above formulations.

EXAMPLE 2

In a manner similar to that described in Example 1, 636 g of the same polycaprolactone diol was reacted at 54° C. to 56° C. with 211.2 g of ethylene oxide using 3.1 g of boron trifluoride etherate as catalyst. The ethylene oxide feed period was 2.5 hours. After completion of the feed the mixture was stirred about 2 hours at about 55° C. and then treated with 17 g of the magnesium silicate at 90° C. for 1.5 hours. The volatiles were removed at 90° C. under vacuum to a pressure of 4 mm Hg. The hot mixture was filtered to remove solids and 845 g of light yellow liquid having a hydroxyl number of 142.8 and an average molecular weight of 785 was recovered. The polycaprolactone-polyoxyethylene adduct solidified on cooling to room temperature (Adduct B).

A 759 g portion of Adduct B was reacted at 135° C. for one hour with 5.8 g of triphenyl phosphite. After cooling to 60° C., 16.6 g of p-toluene sulfonic acid, 139 g of acrylic acid, 5.7 g of alloocimene, 1.35 g of activated carbon, 0.069 g of the monomethyl ether of hydroquinone and 397 g of hexane were added and the mixture was refluxed at 65° C. to 74° C. for 21.5 hours, under nitrogen, while 32.3 g of water was azeotropically removed. The contents were then cooled to 20° C. and neutralized to a pH of about 7 with 169.5 g of a 7.5 weight percent aqueous sodium hydroxide solution. The system separated into two phases and the lower aqueous phase was removed and discarded. The organic phase was vacuum distilled to a final pressure of 2 mm Hg at 50° C. to remove volatiles and solvent and then filtered. There was recovered 771 g of a clear, light yellow liquid acrylate ester of the polycaprolactone-polyoxyethylene adduct having a Brookfield viscosity of 120 cks at 38° C., a Gardner color of 3.5, an ester functionality of 6, an acrylate functionality of 1.74, an inhibitor content of 204 ppm and a residual acidity of 0.115% calculated as acrylic acid (Ester B).

In a similar manner a difunctional acrylate ester is produced using a polycaprolactone diol having an average molecular weight of 1,250, produced by the reaction of ethylene glycol with epsilon-caprolactone, by initially reacting the diol with propylene oxide followed by esterification with acrylic acid.

A series of formulations was produced as described in Example 1 using the same concentrations of photoinitiator and silicone wetting agent. These are summarized in Table II.

TABLE II

| Run | 1 | 2 | 3 |
|---|---|---|---|
| Ester B | 97 | 72 | 72 |
| TMPTA | — | 25 | — |
| PETA | — | — | 25 |
| Viscosity, cps, 25° C. | 24 | 500 | 290 |
| Gloss, 60° | 36 | 48 | 24 |

EXAMPLE 3

A stainless steel stirred antoclave was charged with 530 g of the same polycaprolactone diol used in Example 1 and 4.4 g of boron trifluoride etherate. Over a 20 minutes period a mixture of 88.5 g of ethylene oxide and 116 g of propylene oxide was added at a temperature of 47° C. to 53° C.; during the addition a pressure of 20 psi was generated. The contents of the autoclave were stirred for an additional 2.5 hours at about 50° C. and the pressure declined to 10 psi. After cooling to room temperature and releasing the pressure 14 g of the magnesium silicate was added and the reaction mixture was stirred at 90° C. for 3 hours, the last hour of which was under vacuum to remove volatiles. The hot solution was filtered to yield 772 g of an amber liquid that solidified on cooling. The polycaprolactone-poly(oxyethylene-oxyproylene) adduct had an hydroxyl number of 137.6 and an average molecular weight of 817; the Brookfield viscosity at 38° C. was 216 cks and the Gardner color was 5 (Adduct C).

A 408.5 portion of Adduct C was reacted for one hour with 3.06 g of triphenyl phosphite at about 135° C. After cooling to 60° C. there were charged 72 g of acrylic acid, 8.3 g of p-toluene sulfonic acid, 3.06 of 2,4-dimethyl-2,4,6-octatriene, 0.2 g of the monomethyl ether of hydroquinone, 0.7 g of activated carbon and 212 g of hexane and the mixture was refluxed, under nitrogen, for 23.5 hours during which period 16.7 g of water was azeotropically removed. The contents of the reactor were cooled to 25° C. and neutralized to a pH of about 7 with 84.3 g of a 7.5 weight percent aqueous sodium hydroxide solution and 200 g of toluene was added. The system separated into two phases and the lower aqueous phase was removed and discarded. The organic phase was vacuum distilled to a final pressure of 2 mm Hg at 50° C. There was recovered 426 g of stripped product which was filtered to yield 355 g of a clear liquid having a Gardner color of 5.5, Brookfield viscosity of 132 cks at 38° C., ester functionality of 5.99, acrylate functionality of 1.78, inhibitor content of 550 ppm and residual acidity of 0.17% calculated as acrylic acid (Ester C).

In a similar manner a difunctional acrylate ester is produced by initially reacting the polycaprolactone diol with four equivalents of ethylene oxide per hydroxyl equivalent in the diol followed by reaction of the oxyethylene adduct produced with three equivalents of propylene oxide per hydroxyl equivalent so as to produce a block oxyethylene-oxypropylene adduct. This block adduct is then esterified with either acrylic acid or methacrylic acid following the same procedure used for producing Ester C.

A series of formulations was produced as described in Example 1 using the same concentrations of photoinitiator and silicone wetting agent. These are summarized in Table III.

TABLE III

| Run | 1 | 2 | 3 |
| --- | --- | --- | --- |
| Ester C | 97 | 72 | 72 |
| TMPTA | — | 25 | — |
| PETA | — | — | 25 |
| Viscosity, cps. 25° C. | 175 | 150 | 200 |
| Gloss, 60° | 45 | 55 | 30 |

What is claimed is:

1. A polyester-polyether copolymer of the formula:

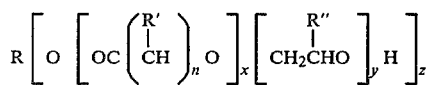

wherein
R is the organic residue of a mono-, di-, tri- or tetrahydroxyl alcohol having from 1 to 20 carbon atoms;
R' is hydrogen or alkyl having from 1 to 6 carbon atoms, with the proviso that at least n+2 of the R' groups in the —OC(CR'H)$_n$O— moiety are hydrogen atoms;
R" is hydrogen, methyl or ethyl;
n is an integer having a value of from 4 to 7;
x is an integer having an average value of from 2 to 250;
y is an integer having an average value of from 1 to 100;
z has a value equal to the valence of R and is from 1 to 4.

2. A polyester-polyether as claimed in claim 1, wherein x has an average value of from 2 to 50 and y has an average of from 2 to 25.

3. A polyester-polyether as claimed in claim 1, wherein x and y each have an average value of from 2 to 10.

4. A polyester-polyether as claimed in claim 1, wherein the oxyalkylene group is an oxyethylene group.

5. A polyester-polyether as claimed in claim 1, wherein the oxyalkylene group is an oxypropylene group.

6. A polyester-polyether as claimed in claim 1, wherein the oxyalkylene group is a copoly(oxyethyleneoxypropylene) group.

7. A polyester-polyether as claimed in claim 1, wherein R' is hydrogen and n has a value of 5.

8. A polyester-polyether as claimed in claim 1 of the average formula:

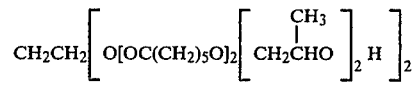

9. A polyester-polyether as claimed in claim 1 of the average formula:

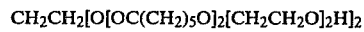

10. A polyester-polyether as claimed in claim 1 of the average formula:

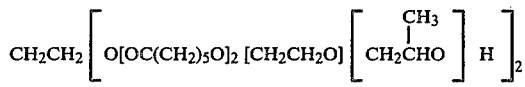

11. An acrylyl ester of the formula:

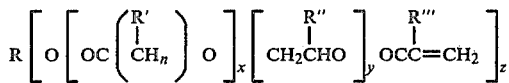

wherein
R is the organic residue of a mono-, di- tri- or tetrahydroxyl alcohol having from 1 to 20 carbon atoms;
R' is hydrogen or alkyl having from 1 to 6 carbon atoms, with the proviso that at least n+2 of the R' groups in the —OC(CR'H)$_n$O— moiety are hydrogen atoms;
R" is hydrogen, methyl or ethyl;
R'" is hydrogen, methyl or cyano;
n is an integer having a value of from 4 to 7;
x is an integer having an average value of from 2 to 250;
y is an integer having an average value of from 1 to 100;
z has a value equal to the valence of R and is from 1 to 4.

12. An acrylyl ester as claimed in claim 11, wherein R'" is hydrogen.

13. An acrylyl ester as claimed in claim 11, wherein x has an average value of from 2 to 50 and y has an average value of from 2 to 25.

14. An acrylyl ester as claimed in claim 11, wherein x and y each have an average value of from 2 to 10.

15. An acrylyl ester as claimed in claim 11, wherein the oxyalkylene group is an oxyethylene group.

16. An acrylyl ester as claimed in claim 11, wherein the oxyalkylene group is an oxypropylene group.

17. An acrylyl ester as claimed in claim 11, wherein the oxyalkylene group is a copoly(oxyethyleneoxypropylene) group.

18. An acrylyl ester as claimed in claim 11, wherein R' is hydrogen and n has a value of 5.

19. An acrylyl ester as claimed in claim 11 of the average formula:

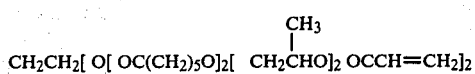

20. An acrylyl ester as claimed in claim 11 of the average formula:

$$CH_2CH_2[O[OC(CH_2)_5O]_2[CH_2CH_2O]_2OCCH=CH_2]_2$$

21. An acrylyl ester as claimed in claim 11 of the average formula:

* * * * *

UNITED STATES PATENT AND TRADEMARK OFFICE
CERTIFICATE OF CORRECTION

PATENT NO. : 4,281,172
DATED : July 28, 1981
INVENTOR(S) : Robert J. Knopf

It is certified that error appears in the above-identified patent and that said Letters Patent are hereby corrected as shown below:

Column 6, line 59, the value "772" should be read as "722".

Column 7, line 43, the word "block" should be inserted after "polyether".

Signed and Sealed this

Twenty-second Day of September 1981

[SEAL]

Attest:

GERALD J. MOSSINGHOFF

Attesting Officer

Commissioner of Patents and Trademarks